United States Patent [19]

Schwarzfischer et al.

[11] Patent Number: 4,543,009
[45] Date of Patent: Sep. 24, 1985

[54] INTERNAL ENDWISE CONNECTOR FOR CHANNEL PROFILE

[75] Inventors: Peter Schwarzfischer, Schalksmühle, Fed. Rep. of Germany; Jochen Schmitz, Birmensdorf; Peter Scheller, Meilen, both of Switzerland

[73] Assignee: Firma Erco Leuchten GmbH, Ludenscheid, Fed. Rep. of Germany

[21] Appl. No.: 472,197

[22] Filed: Mar. 4, 1983

[30] Foreign Application Priority Data

Mar. 4, 1982 [DE] Fed. Rep. of Germany ....... 3207711

[51] Int. Cl.$^4$ .............................................. F16B 7/04
[52] U.S. Cl. .................................. 403/201; 403/255; 403/297
[58] Field of Search ............... 403/252, 257, 255, 297, 403/245, 246, 189, 187, 201

[56] References Cited

U.S. PATENT DOCUMENTS

| | | | |
|---|---|---|---|
| 3,514,135 | 5/1970 | Cooper | 403/297 X |
| 3,574,367 | 4/1971 | Jankowski | 403/297 X |
| 4,345,849 | 8/1982 | Stenemann | 403/252 |

FOREIGN PATENT DOCUMENTS

| | | |
|---|---|---|
| 1650975 | 10/1970 | Fed. Rep. of Germany . |
| 1789301 | 5/1971 | Fed. Rep. of Germany . |
| 3207711 | 12/1983 | Fed. Rep. of Germany . |
| 870756 | 6/1961 | United Kingdom ................ 403/187 |

Primary Examiner—Andrew V. Kundrat
Attorney, Agent, or Firm—Karl F. Ross; Herbert Dubno

[57] ABSTRACT

A connector designed to form a butt joint between two channel profiles, or between one such profile and some other member, comprises an elongate wedge piece with flanks diverging downwardly toward the channel bottom and a spring clip with similarly diverging legs having serrated lower edges and straddling the wedge piece over part of its length. A central web of the spring clip, spacedly overlying the top surface of the wedge piece remote from the channel bottom, terminates in a tongue whose tip enters a slit in that surface which it approaches at an acute angle of inclination. A screw with a shank traversing a slot in the web of the spring clip is threaded into the wedge piece and, upon tightening, forces the serrated edges into firm engagement with lateral channel walls while reducing the spacing of the wedge piece from the web with consequent decrease of the angle of inclination of the tongue which therefore exerts a longitudinal thrust upon the wedge piece whose opposite end is anchored to the member to be joined to the channel profile whereby this member is drawn into close contact with the adjacent end of that profile. The anchoring of the wedge piece to the other member may be effected by a second spring clip, symmetrical to the first one, whose tongue extends in the opposite direction.

10 Claims, 6 Drawing Figures

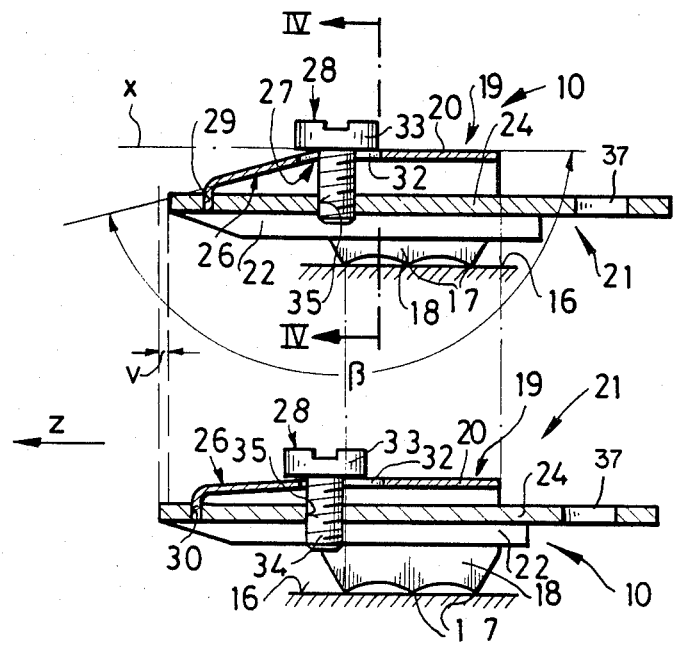
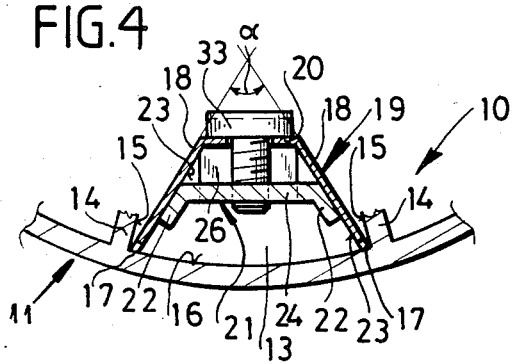

INTERNAL ENDWISE CONNECTOR FOR CHANNEL PROFILE

FIELD OF THE INVENTION

Our present invention relates to a connector serving to be placed inside a channel profile for joining an end of that profile in abutting relationship with an adjacent member, e.g. to form a butt joint between two aligned profiles. Such a channel profile may be designed, for example, as a bus bar for supplying current to a number of loads or as a protective sheath for electric cables.

BACKGROUND OF THE INVENTION

The conventional way of forming butt joints between aligned profiles of this nature is to provide a strap with opposite extremities extending into the two channels thereof, these strap extremities and the channel bottoms being formed with aligned apertures to be traversed by fasteners such as bolts or rivets. A drawback of that arrangement is the need for perforating the channel bottom, which requires a separate operation, and for exactly locating these apertures in order to avoid the existence of an unsightly gap between the adjoining channel ends. The elimination of such a gap is also necessary where leakage of a liquid carried by the channel is to be prevented.

SUMMARY OF THE INVENTION

A connector according to our invention, designed to realize this object, comprises a spring clip with a substantially flat central web having two legs diverging therefrom on opposite sides of a plane of symmetry which longitudinally bisects a channel profile, to be joined to an adjacent member, when the spring clip is positioned with its legs resting on the bottom of the channel close to a pair of sidewalls rising therefrom. A generally flat spreader is inserted between and in close contact with these legs, in a position parallel to the web but at a distance therefrom, and has one extremity projecting longitudinally beyond the web along the plane of symmetry while an opposite extremity of the spreader is anchorable to the adjacent member. The spring clip also has a tongue which extends from its web at an obtuse angle thereto and engages the first-mentioned extremity of the spreader, as by having a bent-over tip inserted into a transverse slit thereof. The spring clip is further provided with clamping means coupled with the spreader and operable to reduce the distance between the latter and the web so as to drive the legs farther apart and into firm contact with the sidewalls of the channel, the free edges of the legs being preferably serrated for securely gripping the sidewalls upon operation of the clamping means. The same operation increases the obtuse angle between the tongue and the web with consequent exertion of a longitudinal thrust by the tongue upon the spreader; this thrust results in a longitudinal shift of the spreader relative to the spring clip whereby the adjacent member anchored to the opposite spreader extremity is forced into close contact with the confronting end of the channel profile.

Advantageously, and as more fully described hereinafter, the spreader is a wedge piece with major surfaces paralleling the web and with diverging flanks contacting the legs of the clip. These legs, as well as the diverging flanks of the wedge piece, may include with each other an angle between approximately 45° and 70°, preferably about 60°. The clamping means adjustably coupling the web and the spreader to each other may simply be designed as a screw traversing a longitudinal slot of the clip at the junction of its web with its tongue to facilitate relative sliding between the clip and the spreader. The head of the screw, which is to be accessible through the open top of the channel profile, should partly overlie the tongue to prevent any deformation of the web at that junction when the tongue is put under pressure.

If the adjacent member is another channel profile similar to the one referred to, the connector may comprise a second spring clip substantially symmetrical to the first clip which straddles the opposite spreader extremity and has a tongue engaging same while the legs of the second clip grip the sidewalls of that other profile. In that case the two clips are provided with independently operable clamping means for anchoring the clips to the respective channels and drawing same toward each other to form a butt joint therebetween.

BRIEF DESCRIPTION OF THE DRAWING

The above and other features of our invention will now be described in detail with reference to the accompanying drawing in which:

FIGS. 3a and 3b are sectional detail views respectively taken on lines IIIa—IIIa of FIG. 1 and IIIb—IIIb of FIG. 2;

FIG. 4 is a fragmentary cross-sectional view taken on the line IV—IV of FIG. 3a.

SPECIFIC DESCRIPTION

Figure 1:
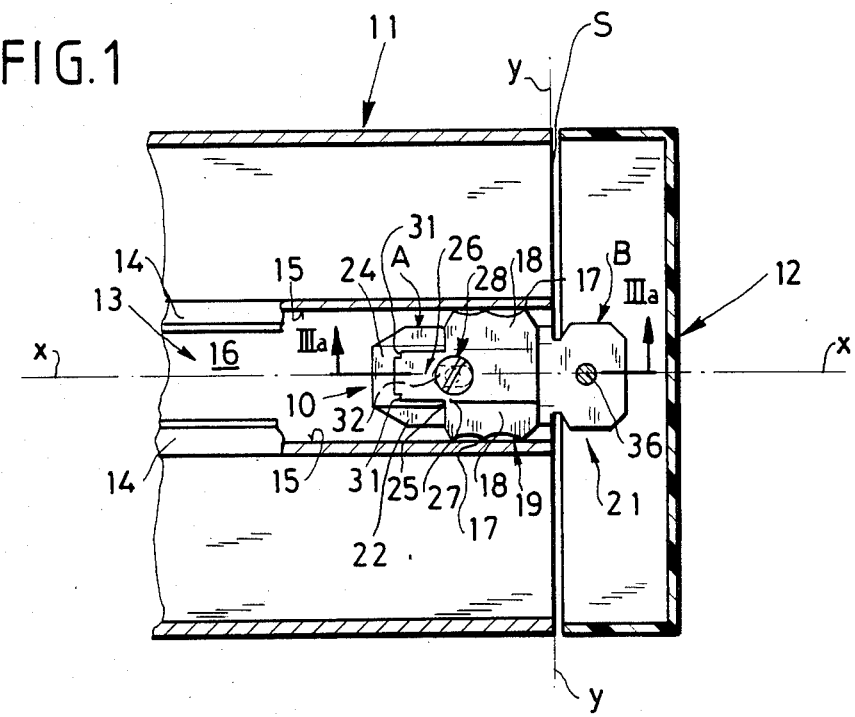
FIG. 1 is a partly sectional top view of a tubular member with a channel profile to be joined to an adjacent end cap by a connector according to our invention.
Figure 2:
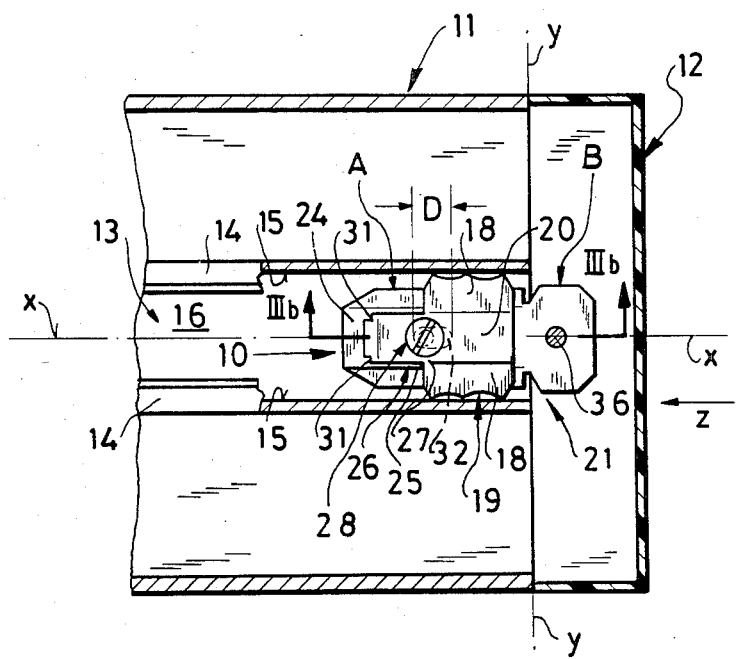
FIG. 2 is a view similar to FIG. 1, showing the tubular member and the end cap in a fully interconnected position.

In FIGS. 1, 2 and 4 we have shown part of a tubular member 11 to be joined to an end cap 12 by a connector 10 embodying our invention. Member 11 is a part-cylindrical sheath of light metal extending over about 270° to form a through going longitudinal slit (not shown), bisected by a plane of symmetry x—x, which enables the introduction of wires or cables to be concealed by that sheath while being suspended from a ceiling or extending along a wall of a room, e.g. on a baseboard thereof. The slit, located at the top of sheath 11 in the view of FIG. 4, overlies an open-topped channel 13 defined by a profile which comprises a longitudinal strip zone of the sheath wall bounded by two upwardly converging sidewalls 14 integral with that wall; these sidewalls form lateral channel surfaces 15 rising from a concave channel bottom 16. End cap 12, made of plastic material, has the same diameter as sheath 11 and may extend over a full circle.

As best seen in FIGS. 3a, 3b and 4, connector 10 comprises a spring clip 19 of trapezoidal outline with a pair of downwardly diverging legs 18 interconnected by a web 20 overlying the channel bottom 16. The three lower edges of legs 18 are serrated, as indicated at 17, to form claws or teeth bearing upon the lateral surfaces 15 at their junctions with channel bottom 16. These legs, straddling a wedge piece 21, include with each other a vertex angle $\alpha$ shown in FIG. 4 to be about 65°. Web 20 is longitudinally extended by a tongue 26 integral therewith, this tongue including with it an obtuse angle β (FIG. 3a) and approaching the upper surface of wedge piece 21 at an acute angle of, say, 20° to 35°. Wedge piece 21 has a trapezoidal profile generally similar to that of spring clip 19 but shallower and of substantially greater wall thickness so as to be rigid rather than resilient, elements 19 and 21 being preferably both made of steel. A flat we 24 of wedge piece 21 lies parallel to the web 20 of clip 19, but at a distance therefrom, between the latter web and the channel bottom 16 while flanks 22 of that piece bear upon the inner surfaces 23 of spring legs 18. Two extremities A and B of wedge piece 21 project beyond the clip 19, extremity A extending farther into the channel 13 whereas extremity B extends beyond the end of sheath 11—lying in a transverse plane y—y—and is fixedly anchored to end cap 12, as by a rivet or pin 36 traversing a hole 37 of web 24. A transverse slit 30 of web extremity A is partly penetrated by a bent-over tip 29 of tongue 26 which has lateral shoulders 31 coming to rest on the upper surface wedge piece 21 to limit the extent of that penetration. A short longitudinal slot 32 of clip 19, located at the junction 27 of web 20 with tongue 26, is penetrated by a threaded shank of a screw 28 whose head 33 overlies part of tongue 26 and is accessible through the aforementioned longitudinal slit of sheath 11 and the open top of channel 13; the shank of screw 28 matingly engages in a threaded hole 35 of web 24.

In FIG. 1, with connector 10 having the configuration of FIG. 3a, sheath 11 and cap 12 are separated from each other by a small gap S adjoining the transverse plane y—y. When, now, the user engages the head 33 of screw 28 with a screwdriver and turns it in the tightening direction (i.e. clockwise as viewed in FIGS. 1 and 2), webs 20 and 24 are pulled toward each other with resulting spreading of spring legs 18 whose serrated edges 17 thereupon bite into the sidewalls 14 of profile channel 13 at their junctions with channel bottom 16. At the same time, as indicated in FIG. 3b, tongue 26 is flattened against the top surface of wedge piece 21 so as to increase its own effective length in a direction z parallel to the axis of tubular sheath 11. As a result, tongue 26 exerts an axial thrust in the direction z upon the wedge piece 21 which accordingly shifts to the left as viewed in FIGS. 3a and 3b, thereby entraining the cap 12 of FIGS. 1 and 2 in the same direction to close the gap S shown in FIG. 1. Thus, the extent v of this leftward shift substantially corresponds to the width of gap S. In the course of that shift, the shank of screw 28 moves leftward within slot 32 while the flanks 22 of wedge piece 21 slide along the inner surfaces 23 of spring legs 18.

Figure 5:
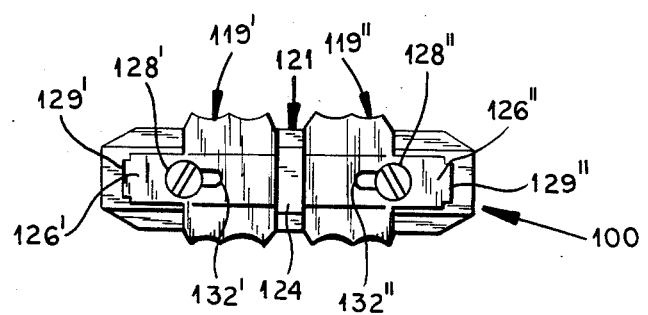
FIG. 5 is a top view of a modified connector according to our invention.

In FIG. 5 we have illustrated a modified connector 100 according to our invention designed to form a butt joint between two axially aligned members each similar to the sheath 11 of the preceding embodiment, these members being initially placed end-to-end with a small intervening gap such as that shown at S in FIG. 1. A wedge piece 121 of connector 100 is symmetrical about that gap, with opposite extremities extending into the channel profiles of the two sheaths in the manner illustrated for extremity A in FIGS. 1 and 2. Each half of wedge piece 121 is straddled by a respective spring clip 119′, 119″ whose web spacedly overlies the web 124 of wedge piece 121, in the manner illustrated in FIG. 4, while oppositely facing tongues 126′ and 126″ integral with clips 119′ and 119″ are coupled with the extremities of web 124 via bent-over tips 129, 129 as described above. Screws 128′ and 128″, traversing respective longitudinal slots 132′ and 132″ of clips 119′ and 119″ are independently operable to immobilize the serrated clip edges against the respective channel profiles and to flatten the tongues 126′, 126″ so as to exert opposite thrusts upon wedge piece 121, thereby driving the clips 119′ and 119″ along with the engaged channel profiles toward each other to eliminate the intervening gap. This mode of operation, of course, is perfectly analogous to that discussed with reference to the unidirectional connector 19 of FIGS. 1-4.

We claim:

1. A connector receivable in a channel profile with a bottom and a pair of upstanding sidewalls for abuttingly joining an end of said profile to an adjacent member, comprising:
a spring clip with a substantially flat central web and with two legs diverging from said web on opposite sides of a plane of symmetry of said spring clip which longitudinally bisects said channel profile upon a positioning of said spring clip between said sidewalls with said legs resting on the channel bottom close to said sidewalls;
a generally flat spreader parallel to said web slidably inserted between said legs in close contact therewith and at a distance from said web, said spreader having one extremity projecting longitudinally beyond said web along said plane of symmetry and further having an opposite extremity anchorable to said adjacent member, said spring clip being further provided with a tongue extending from said web at an obtuse angle thereto in a direction away from the adjacent member and engaging said one extremity of said spreader; and
clamping means on said spring clip coupled with said spreader and operable to reduce the distance between said spreader and said web, thereby driving said legs further apart and into firm contact with said sidewalls while increasing said obtuse angle with consequent exertion of a longitudinal thrust by said tongue upon said spreader, the resulting longitudinal shift of said spreader relative to said spring clip forcing the adjacent member anchored to said opposite extremity into close contact with the confronting end of said profile.

2. A connector as defined in claim 1 wherein said legs have serrated edges gripping said sidewalls upon operation of said clamping means.

3. A connector as defined in claim 1 wherein said spreader is a wedge piece with major surfaces paralleling said web and with diverging flanks contacting said legs.

4. A connector as defined in claim 3 wherein said clamping means comprises a screw traversing a longitudinal slot of said spring clip at the junction of said web with said tongue, said screw threadedly engaging said wedge piece.

5. A connector as defined in claim 4 wherein said screw has a head partly overlying said tongue.

6. A connector as defined in claim 3 wherein said tongue terminates in a bent-over tip received in a transverse slit of said wedge piece.

7. A connector as defined in claim 6 wherein said tip has lateral shoulders coming to rest on said wedge piece for limiting the penetration of said slit by said tip.

8. A connector as defined in claim 3 wherein said wedge piece is an elongate rigid strip with bent-over longitudinal edges forming said flanks.

9. A connector as defined in claim 1 wherein said legs include with each other an angle between substantially 45° and 70°.

10. A connector as defined in claim 1, further comprising a second spring clip substantially symmetrical to the first-mentioned clip straddling said opposite extremity of said spreader with a tongue engaging said opposite extremity and with legs positionable between sidewalls of another channel profile constituting said adjacent member, said second clip being provided with second clamping means operable independently of the first-mentioned clamping means for anchoring said second spring clip to said other channel profile and drawing same toward the first-mentioned channel profile to form a butt joint therewith.

* * * * *